United States Patent
Thirugnanasundaram et al.

(10) Patent No.: US 10,540,667 B2
(45) Date of Patent: Jan. 21, 2020

(54) METHOD AND SYSTEM FOR GENERATING A SEARCH QUERY

(71) Applicant: CONDUENT BUSINESS SERVICES, LLC, Florham Park, NJ (US)

(72) Inventors: Veerasundaravel Thirugnanasundaram, Webster, NY (US); Tong Sun, Penfield, NY (US); Arun Bakthavachalu, Webster, NY (US)

(73) Assignee: Conduent Business Services, LLC, Florham Park, NJ (US)

( * ) Notice: Subject to any disclaimer, the term of this patent is extended or adjusted under 35 U.S.C. 154(b) by 582 days.

(21) Appl. No.: 15/010,139

(22) Filed: Jan. 29, 2016

(65) Prior Publication Data

US 2017/0221084 A1 Aug. 3, 2017

(51) Int. Cl.
*G06Q 10/00* (2012.01)
*G06Q 30/02* (2012.01)
*G06Q 10/10* (2012.01)

(52) U.S. Cl.
CPC ....... *G06Q 30/0204* (2013.01); *G06Q 10/107* (2013.01)

(58) Field of Classification Search
None
See application file for complete search history.

(56) References Cited

U.S. PATENT DOCUMENTS

| | | | |
|---|---|---|---|
| 8,972,275 B2 | 3/2015 | Park et al. | |
| 2007/0282797 A1* | 12/2007 | Wang | G06F 16/9535 |
| 2008/0005090 A1* | 1/2008 | Khan | G06F 16/951 |
| 2009/0157714 A1* | 6/2009 | Stanton | G06F 17/21 |
| 2011/0106642 A1* | 5/2011 | Hassan | G06Q 30/02 705/26.3 |
| 2011/0184827 A1* | 7/2011 | Hubert | G06Q 30/0601 705/26.1 |
| 2011/0213655 A1* | 9/2011 | Henkin | G06Q 30/00 705/14.49 |
| 2012/0066072 A1* | 3/2012 | Kanigsberg | G06Q 30/02 705/14.66 |
| 2013/0138749 A1 | 5/2013 | Bohm et al. | |

(Continued)

OTHER PUBLICATIONS

Loken, Barbara, Categorization Theory and Research in Consumer Psychology, Nov. 8, 2012, Carlson School of Management, http://citeseerx.ist.psu.edu/viewdoc/download?doi=10.1.1.164.8582&rep=rep1&type=pdf, p. 1-31.*

*Primary Examiner* — Joseph M Waesco
(74) *Attorney, Agent, or Firm* — Jones Robb, PLLC

(57) ABSTRACT

A method and a system for generating a search query to extract one or more relevant messages from a plurality of messages shared over a computer network. The method includes extracting a plurality of keywords and information pertaining to a plurality of customers from the plurality of messages. Further, the method identifies a set of influential customers from the plurality of customers based on a first score and a second score. The method further includes extracting a set of influential keywords from a first set of messages based on a first number of occurrences of the plurality of keywords in the plurality of messages within a pre-defined time interval. The method further includes generating the search query that includes at least the set of influential customers and the set of influential keywords.

14 Claims, 6 Drawing Sheets

(56) References Cited

U.S. PATENT DOCUMENTS

| | | | |
|---|---|---|---|
| 2013/0198204 A1* | 8/2013 | Williams | G06F 16/27 707/748 |
| 2013/0226656 A1* | 8/2013 | Sedota, Jr. | G06Q 30/0282 705/7.29 |
| 2013/0226820 A1* | 8/2013 | Sedota, Jr. | G06Q 30/0282 705/319 |
| 2013/0254192 A1 | 9/2013 | Work et al. | |
| 2014/0181095 A1* | 6/2014 | Gross | G06Q 30/00 707/723 |
| 2014/0289239 A1* | 9/2014 | Kanigsberg | G06Q 30/02 707/733 |
| 2014/0297658 A1* | 10/2014 | Kanigsberg | G06Q 30/02 707/750 |
| 2014/0358929 A1* | 12/2014 | Bailey | G06F 16/95 707/738 |
| 2015/0026193 A1* | 1/2015 | Ramesh | G06Q 10/10 707/748 |
| 2015/0032504 A1 | 1/2015 | Elango et al. | |
| 2015/0112755 A1* | 4/2015 | Potdar | G06Q 30/0201 705/7.29 |
| 2015/0112756 A1* | 4/2015 | Subramanian | G06Q 30/0201 705/7.29 |
| 2015/0120717 A1* | 4/2015 | Kim | G06F 16/335 707/727 |
| 2015/0356127 A1* | 12/2015 | Pierre | G06F 16/2228 707/706 |
| 2016/0132570 A1* | 5/2016 | Cathcart | G06Q 10/10 707/727 |
| 2016/0283906 A1* | 9/2016 | Cranfill | G06Q 10/105 |
| 2017/0075877 A1* | 3/2017 | Lepeltier | G06F 17/2705 |
| 2017/0091289 A1* | 3/2017 | Ohazulike | G06Q 50/01 |

* cited by examiner

METHOD AND SYSTEM FOR GENERATING A SEARCH QUERY

TECHNICAL FIELD

The presently disclosed embodiments are related, in general, to data mining. More particularly, the presently disclosed embodiments are related to method and system for generating a search query to extract one or more relevant messages from a plurality of messages shared over a computer network.

BACKGROUND

Social networking platforms provide information that may be potentially relevant for various organizations such as marketing organizations. Such information may be available publicly on the social networking platforms, which may enable business organizations to monitor and track user's activity on the social networking platforms and further identify potential customers for their respective services and products.

Existing tools and techniques utilize keyword based or query based searches called "stream definitions" to extract user conversations (plurality of messages) over the social networking platforms. However, such stream definitions or search queries need to be manually updated to identify changing behavior of customer preferences, occurring events and trending topics over a period of time. Further, such queries may lead to extraction of redundant and noisy conversations/spam messages that may make manual analysis of the extracted messages difficult for business organizations.

Further limitations and disadvantages of conventional and traditional approaches will become apparent to one skilled in the art, through comparison of described systems with some aspects of the present disclosure, as set forth in the remainder of the present application and with reference to the drawings.

SUMMARY

According to embodiments illustrated herein, there is provided a method to generate a search query to extract one or more relevant messages from a plurality of messages shared over a computer network by utilizing one or more processors. The method may extract a plurality of keywords and information pertaining to a plurality of customers from the plurality of messages. The method may further identify a set of influential customers from the plurality of customers based on a first score and a second score. In an embodiment, the first score is indicative of a measure of influence of each of the plurality of customers on other customers in the plurality of customers. In an embodiment, the second score is indicative of a degree of connectivity of each of the plurality of customers with the other customers in the plurality of customers and a measure of actions performed on each of the plurality of messages published by each of the plurality of customers. The method further may extract a set of influential keywords from a first set of messages based on a first number of occurrences of the plurality of keywords in the plurality of messages within a pre-defined time interval. In an embodiment, the first set of messages may correspond to messages published by the set of influential customers. The method may further generate the search query that may include at least the set of influential customers, and the set of influential keywords.

According to embodiments illustrated herein, there is provided a system that comprises an application server configured to extract one or more relevant messages from a plurality of messages shared over a computer network. The application server may comprise one or more processors configured to extract a plurality of keywords and information pertaining to a plurality of customers from the plurality of messages. The one or more processors may further be configured to identify a set of influential customers from the plurality of customers based on a first score and a second score. In an embodiment, the first score is indicative of a measure of influence of each of the plurality of customers on other customers in the plurality of customers. In an embodiment, the second score is indicative of a degree of connectivity of each of the plurality of customers with the other customers in the plurality of customers and a measure of actions performed on each of the plurality of messages published by each of the plurality of customers. The one or more processors may further be configured to extract a set of influential keywords from a first set of messages based on a first number of occurrences of the plurality of keywords in the plurality of messages within a pre-defined time interval. In an embodiment, the first set of messages may correspond to messages published by the set of influential customers. The one or more processors may be further configured to generate the search query that may include at least the set of influential customers, and the set of influential keywords.

According to embodiments illustrated herein, a non-transitory computer-readable storage medium having stored thereon, a set of computer-executable instructions for causing a computer comprising one or more processors to perform steps of extracting a plurality of keywords and information pertaining to a plurality of customers from a plurality of messages. The one or more processors may be configured to identify a set of influential customers from the plurality of customers based on a first score and a second score. In an embodiment, the first score is indicative of a measure of influence of each of the plurality of customers on other customers in the plurality of customers. In an embodiment, the second score is indicative of a degree of connectivity of each of the plurality of customers with the other customers in the plurality of customers and a measure of actions performed on each of a plurality of messages published by each of the plurality of customers. The one or more processors may be further configured to extract a set of influential keywords from a first set of messages based on a first number of occurrences of the plurality of keywords in the plurality of messages within a pre-defined time interval. In one embodiment, the first set of messages may correspond to messages published by the set of influential customers. The one or more processors may be further configured to generate a search query that may include at least the set of influential customers, and the set of influential keywords.

These and other features and advantages of the present disclosure may be appreciated from a review of the following detailed description of the present disclosure, along with the accompanying figures in which like reference numerals refer to like parts throughout.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION

Figure 1:
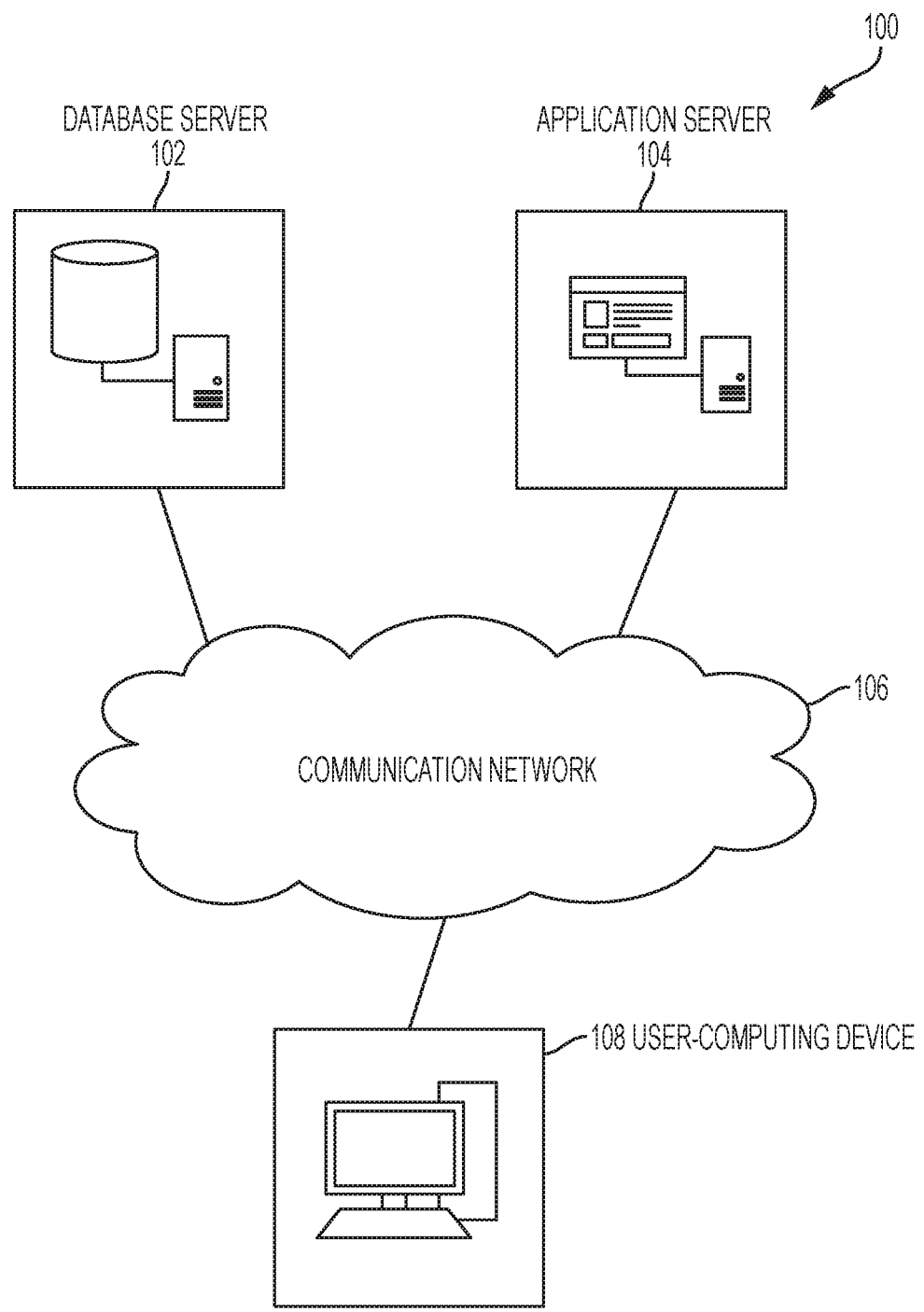
FIG. 1 is a block diagram that illustrates a system environment in which various embodiments of the method and the system are implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Definitions: The following terms shall have, for the purposes of this application, the respective meanings set forth below.

A "search query" refers to a combination of one or more keywords that may be utilized to extract information from a plurality of data sources. In an embodiment, the plurality of data sources may correspond to social networking platforms. The search query may be formed by multiple Boolean operators such as ANY, AND, OR, NEAR and NOT. In an embodiment, the Boolean operators may be utilized to limit, widen or further refine the search query to extract relevant information.

A "message" refers to information shared among the users over the World Wide Web. For example, a user may have shared a message on a social networking site. In an embodiment, the message may correspond to a text message, a video message, or an audio message. In an embodiment, such shared message may correspond to a comment, a post, a share, or a tweet.

A "keyword" refers to terms used in a message shared by a user on the World Wide Web. In an embodiment, the keyword may correspond to the terms used in a message or a post published over the social networking platforms by a user.

A "set of influential keywords" refers to terms used in a plurality of messages shared over social networking platforms that may correspond to an organization. For example, the message shared by a user is related to a product or service of the organization. In an embodiment, the set of influential keywords are a subset of a plurality of keywords in the plurality of messages.

A "set of spam keywords" refers to unwanted terms/keywords that are not related to an organization. For example, the set of spam keywords are not related to a product or service associated with the organization. In an embodiment, the set of spam keywords are a subset of a plurality of keywords.

"One or more first common keywords" refer to keywords utilized by each customer from a set of influential customers. One or more first common keywords refer to keywords that are identified based on a number of occurrences of the plurality of keywords in a first set of messages generated by the set of influential customers.

"One or more second common keywords" refer to keywords utilized by each customer from a set of spam customers. One or more relevant spam keywords refer to keywords that are identified based on a first number of occurrences of the plurality of keywords in a second set of messages generated by the set of spam customers.

A "plurality of customers" refers to users that publish a plurality of messages on a social networking platforms. In an embodiment, the plurality of customers may utilize/avail products/services of an organization. In an embodiment, the plurality of customers may correspond to either a subset of users on the social networking platforms or it may include other users as well.

A "set of influential customers" refers to one or more customers who are active over the social networking platforms. In an embodiment, a customer from a plurality of customers may be identified as an influential customer in the set of influential customers based on a measure of influence of the customer on other customers in the plurality of customers and/or a degree of connectivity of the customer with the other customers in the plurality of customers. In an embodiment, the measure of influence and/or the degree of connectivity may be compared with a predefined threshold to extract the set of influential customers from the plurality of customers.

A "set of spam customers" refers to the customers who have created a fake profile over the social networking platforms. In an embodiment, the set of spam customers may publish fake comments, likes and posts regarding the products/services related to the organization.

A "first score" refers to a value that is indicative of a measure of influence of each of the plurality of customers on other customers in the plurality of customers.

A "second score" refers to a value that is indicative of a degree of connectivity of each of the plurality of customers with the other customers in the plurality of customers, and a measure of actions performed on each of the plurality of messages published by each of the plurality of customers.

A "first set of messages" refers to messages from a plurality of messages published by a set of influential customers. A "second set of messages" refers to messages from a plurality of messages published by a set of spam customers.

"One or more first attributes" refer to a profile id, a description of a user, a registration date, a follower's count, and/or a followee's count. One or more second attributes refer to a number of hash-tags, a number of URL's in each message from the plurality of messages, a number of re-tweets, a number of mentions, HTTP links, trending topics, and duplicate tweets.

A "first rank" refers to a rank/number assigned to each customer in a set of spam customers based on one or more first attributes and one or more second attributes.

A "second rank" refers to a rank/number assigned to each customer from a set of influential customers based on a first score and a second score.

A "third rank" refers to a rank/number assigned to each event from one or more events based on a first number of occurrences of a plurality of keywords in a plurality of messages. In an embodiment, the third rank is assigned to each event from one or more events that are categorized in a first event category or a second event category.

"One or more relevant influential customers" refer to a customer identified from a set of influential customers based on a second rank. In an embodiment, the one or more relevant influential customers may correspond to top influential customers from a plurality of customers.

"One or more relevant spam customers" refer to a customer identified from a set of spam customers based on a first rank. In an embodiment, the one or more relevant spam customers may correspond to top spam customers from a plurality of customers.

"One or more events" refer to one or more nouns extracted from a plurality of keywords. In an embodiment, each event from the one or more events may be categorized into a first event category and a second event category. The first event category refers to the category where a first event occurred within the pre-defined time interval. The second event category refers to the category where a second event occurred before the pre-defined time interval and has occurred within the pre-defined time interval.

A "set of relevant first events" refers to the events that are selected from events categorized in a first event category based on a third rank assigned to each event in the first event category. In an embodiment, the third rank associated with the events in the first event category is compared with a threshold to identify the set of relevant first events. In an embodiment, the set of relevant first events may correspond to top new events that have occurred within a pre-defined time interval.

A "set of relevant second events" refers to the events categorized under a second event category based on a third rank assigned to each event from the second event category. In an embodiment, the set of relevant second events may correspond to top anomaly events that have occurred before the pre-defined time interval and have occurred within the pre-defined time interval. In an embodiment, the third rank associated with the events in the second event category is compared with a threshold to identify the set of relevant second events.

FIG. 1 is a block diagram that illustrates a system environment 100 in which various embodiments of method and system are implemented. The system environment 100 includes a database server 102, an application server 104, a communication network 106, and a user-computing device 108. The database server 102, the application server 104, and the user-computing device 108 are communicatively coupled to each other via the communication network 106. In an embodiment, the application server 104 communicates with the database server 102 using one or more protocols such as, but not limited to, Open Database Connectivity (ODBC) protocol and Java Database Connectivity (JDBC) protocol. In an embodiment, the user-computing device 108 communicates with the application server 104, via the communication network 106.

In an embodiment, the database server 102 is operable to receive data associated with a plurality of customers from one or more social networking platforms. In an embodiment, the data may include, but not limited to, messages, conversations, text, image, video, posts and comments. In an embodiment, the database server 102 is operable to store the received data associated with the plurality of customers in a structured manner. The database server 102 is realized through various technologies such as, but not limited to, Microsoft® SQL Server, Oracle®, IBM DB2®, Microsoft Access®, PostgreSQL®, MySQL® and SQLite®, and the like.

A person having ordinary skill in the art will understand that the scope of the disclosure is not limited to the database server 102 as a separate entity. In an embodiment, the functionalities of the database server 102 can be integrated into the application server 104.

In an embodiment, the application server 104 refers to a computing device or a software framework hosting an application or a software service. In an embodiment, the application server 104 is implemented to execute procedures such as, but not limited to, programs, routines, or scripts stored in one or more memories for supporting the hosted application or the software service. In an embodiment, the hosted application or the software service is configured to perform one or more predetermined operations. The application server 104 is realized through various types of application servers such as, but not limited to, a Java application server, a .NET framework application server, a Base4 application server, a PHP framework application server, or any other application server framework.

In an embodiment, the application server 104 is configured to generate a search query to extract one or more relevant messages from a plurality of messages shared over a computer network. The application server 104 is further configured to extract a plurality of keywords and information pertaining to a plurality of customers from the plurality of messages. The application server 104 is configured to identify a set of influential customers from the plurality of customers based on a first score and a second score. In an embodiment, the first score corresponds to a measure of influence of a customer from the plurality of customers on the other customers of the plurality of customers. In an embodiment, the second score corresponds to a degree of connectivity of each of the plurality of customers with other customers of the plurality of customers. The application server 104 is further configured to extract a set of influential keywords from a first set of messages based on a first number of occurrences of the plurality of keywords in the plurality of messages within a pre-defined time interval. In an embodiment, the first set of messages corresponds to the messages published by the set of influential customers. The application server 104 is configured to generate the search query that may include at least the set of influential customers, and the set of influential keywords. The application server 104 is further configured to transmit the search query to extract one or more relevant messages on the user-computing device 108.

A person having ordinary skill in the art will appreciate that the scope of the disclosure is not limited to realizing the application server 104 and the user-computing device 108 as separate entities. In an embodiment, the application server 104 may be realized as an application program installed on and/or running on the user-computing device 108 without departing from the scope of the disclosure.

In an embodiment, the communication network 106 includes a medium through which the database server 102, the application server 104, and the user-computing device 108 communicate with each other. Such a communication is performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 106 includes, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In an embodiment, the user-computing device 108 refers to a computing device used by a user. The user-computing device 108 comprises of one or more processors and one or more memories. The one or more memories may include computer readable code that is executable by the one or more processors to perform predetermined operations. In an embodiment, the user-computing device 108 may include hardware and software that may be configured to display the query generated by the application server 104. Further, the user-computing device 108 may be configured to display the set of influential customers, a set of spam customers, a set of spam keywords, and one or more events. Examples of the user-computing device 108 include, but are not limited to, a personal computer, a laptop, a personal digital assistant (PDA), a mobile device, a tablet, or any other computing device.

Figure 2:
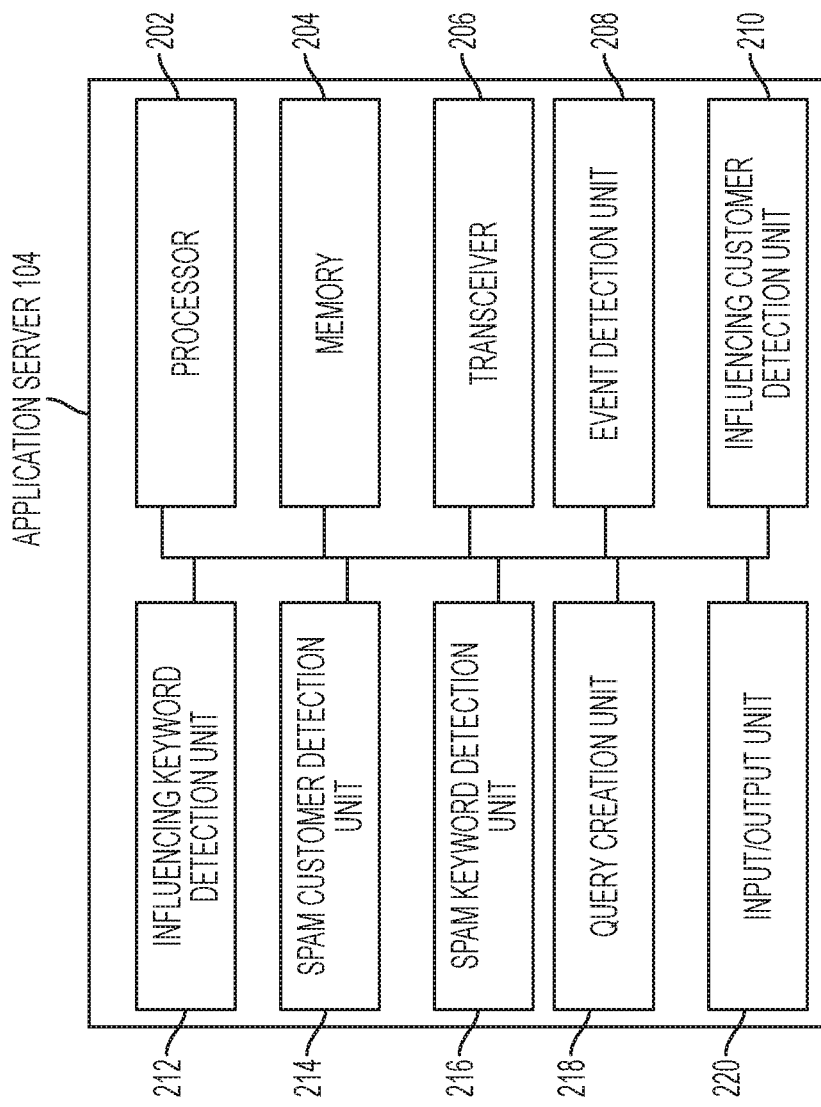
FIG. 2 is a block diagram that illustrates an application server configured to generate a search query to extract one or more relevant messages from a plurality of messages shared over a computer network, in accordance with at least one embodiment.

FIG. 2 is a block diagram that illustrates the application server 104 configured to generate a search query by extracting the one or more relevant messages from the plurality of messages shared over a computer network, in accordance with at least one embodiment. FIG. 2 is explained in conjunction with elements in FIG. 1. In an embodiment, the application server 104 includes a processor 202, a memory 204, a transceiver 206, an event detection unit 208, an influencing customer detection unit 210, an influencing keyword detection unit 212, a spam customer detection unit 214, a spam keyword detection unit 216, a query creation unit 218, and an input/output unit 220. The processor 202 is communicatively connected to the memory 204, the transceiver 206, the event detection unit 208, the influencing customer detection unit 210, the influencing keyword detection unit 212, the spam customer detection unit 214, the spam keyword detection unit 216, the query creation unit 218, and the input/output unit 220. The transceiver 206 is communicatively coupled to the communication network 106.

The processor 202 comprises suitable logic, circuitry, interfaces, and/or code that is operable to execute a set of instructions stored in the memory 204. In an embodiment, the processor 202 may be configured to extract the plurality of keywords and information pertaining to the plurality of customers from the plurality of messages shared over the network. The processor 202 is implemented based on a number of processor technologies known in the art. Examples of the processor 202 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 204 comprises suitable logic, circuitry, interfaces, and/or code that is operable to store the set of instructions that are executed by the processor 202. In an embodiment, the memory 204 is operable to store one or more programs, routines, or scripts that are executed by the processor 202. The memory 204 is implemented based on a Random Access Memory (RAM), a Read-Only Memory (ROM), a Hard Disk Drive (HDD), a storage server, and/or a Secure Digital (SD) card.

The transceiver 206 comprises of suitable logic, circuitry, interfaces, and/or code that is operable to receive data associated with the plurality of customers from the one or more social networking platforms from the database server 102, via the communication network 106. The transceiver 206 is further operable to transmit the received data associated with the plurality of customers from the one or more social networking platforms to the user-computing device 108, via the communication network 106. The transceiver 206 implements known technologies to support wired or wireless communication with the communication network 106. In an embodiment, the transceiver 206 includes, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 communicates via wireless communication with networks, such as the Internet, an Intranet and/or a wireless network, such as a cellular telephone network, a wireless local area network (LAN) and/or a metropolitan area network (MAN). The wireless communication uses any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The event detection unit 208 comprises suitable logic, circuitry, interfaces, and/or code that may be configured to detect the one or more events by extracting one or more nouns from the plurality of keywords in the plurality of messages. Further, the event detection unit 208 may be configured to perform one or more pre-processing operations on the plurality of keywords. In an embodiment, the one or more pre-processing operations may include tokenizing, stemming, POS tagging, removing stop words, dirty words, and the like. In an embodiment, the event detection unit 208 may be configured to categorize each of the one or more events into a first event category, or a second event category. In an embodiment, events categorized in the first event category have occurred within the pre-defined time interval. Further, in an embodiment, events categorized in the second event category have occurred before the pre-defined time interval and have occurred within the pre-defined time interval. In an embodiment, the events in the first event category may correspond to 'new' events that have not been detected previously and have a large number of occurrences in the plurality of messages shared over the social networking platforms within the pre-defined time interval. In an embodiment, the events in the second event category may correspond to 'anomalous' events which may have occurred before the pre-defied time interval but number of occurrences of such events have increased in the plurality of messages shared over the social networking platforms within the pre-defined time interval. In an embodiment, the event detection unit 208 may be configured to assign a third rank to each event from the one or more events based on the first number of occurrences of the plurality of keywords in the plurality of messages extracted corresponding to the predefined time interval. In an embodiment, the event detection unit 208 may be implemented as an Application-Specific Integrated Circuit (ASIC) microchip designed for a special application, such as to determine a set of relevant first events and a set of relevant second events from the categorized one or more events based on the third rank.

The influencing customer detection unit 210 comprises suitable logic, circuitry, interfaces, and/or code that may be configured to determine the first score associated with the plurality of customers. In an embodiment, the first score may correspond to a Klout score. Further, the influencing customer detection unit 210 may be configured to determine the second score associated with the plurality of customers. The influencing customer detection unit 210 may further be configured to assign the second rank to each customer from the set of influential customers based on the first score and the second score. Further, the influencing customer detection unit 210 may be configured to identify one or more relevant influencing customers from the set of influential customers based on the second rank. In another embodiment, the influencing customer detection unit 210 may be implemented as an Application-Specific Integrated Circuit (ASIC) microchip designed for a special application, such as to identify the set of influential customers from the plurality of customers based on the first score and the second score.

The influencing keyword detection unit 212 comprises suitable logic, circuitry, interfaces, and/or code that may be configured to extract the set of influential keywords from the first set of messages based on the first number of occurrences of the plurality of keywords in the plurality of messages within the pre-defined time interval. Further, the influencing keyword detection unit 212 may be configured to extract one or more first common keywords from the first set of messages. In another embodiment, the influencing keyword detection unit 212 may be implemented as an Application-Specific Integrated Circuit (ASIC) microchip designed for a special application, such as to identify one or more relevant influencing keywords from the one or more first common keywords.

The spam customer detection unit 214 comprises suitable logic, circuitry, interfaces, and/or code that may be configured to identify the set of spam customers based on one or more first attributes of a profile associated with each customer from the plurality of customers, and one or more second attributes associated with the plurality of messages published by each of the plurality of customers. Further, the spam customer detection unit 214 may be configured to assign a first rank to each customer from the set of spam customers based on the one or more first attributes and the one or more second attributes. In an embodiment, the spam customer detection unit 214 may be implemented as an Application-Specific Integrated Circuit (ASIC) microchip designed for a special application, such as to identify one or more relevant spam customers from the set of spam customers based on the first rank.

The spam keyword detection unit 216 comprises suitable logic, circuitry, interfaces, and/or code that may be configured to extract the set of spam keywords from a second set of messages (messages published by spam customers) based on the first number of occurrences of the plurality of keywords in the plurality of messages within the pre-defined time interval. Further, the spam keyword detection unit 216 may be configured to extract one or more second common keywords from the second set of messages. In another embodiment, the spam keyword detection unit 216 may be implemented as an Application-Specific Integrated Circuit (ASIC) microchip designed for a special application, such as to identify one or more relevant spam keywords from the one or more second common keywords.

The query creation unit 218 comprises suitable logic, circuitry, interfaces, and/or code that may be configured to create search queries using a combination of one or more keywords/terms along with multiple Boolean operators like ANY, AND, OR, NEAR and NOT, and the like. Thus, it is possible to build multiple combination of keywords to limit, widen or further refine the search query to extract one or more relevant messages from the plurality of messages shared over the computer network. In an embodiment, the query creation unit 218 may be implemented as an Application-Specific Integrated Circuit (ASIC) microchip designed for a special application, such as to include at least the one or more relevant influencing customers and the one or more relevant influencing keywords, include events in the first event category and/or exclude events in the second event category, and exclude at least the set of spam customers and the set of spam keywords in the generated search query.

The input/output device 220 comprises suitable logic, circuitry, interfaces, and/or code that is operable to receive an input or provide an output to a user. The input/output device 220 comprises various input and output devices that are operable to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker.

In operation, the processor 202 may be configured to extract the plurality of messages pertaining to the plurality of customers for the predefined time interval from the database server 102. In an embodiment, the plurality of messages may correspond to messages shared by the plurality of customers on the social networking platforms. In an embodiment, the plurality of messages are stored on the database server 102.

Further, the processor 202 may be configured to determine the first number of occurrences of the plurality of keywords in the plurality of messages. In an embodiment, to determine the occurrences of the plurality of words, the processor 202 may apply one or more text processing techniques such as, but are not limited to, part of speech recognition, removal of stop words from the plurality of words, stemming the plurality of words.

Based on the plurality of keywords and the information pertaining to the plurality of customers from the plurality of messages extracted by the processor 202, the event detection unit 208 may be configured to perform the one or more pre-processing operations on the plurality of keywords. The one or more pre-processing operations on the plurality of keywords may include tokenizing, stemming, POS tagging, removal of stop words, dirty words, and the like. In an embodiment, the extracted plurality of messages may further be tokenized into tokens of words. For example, the extracted plurality of messages may segmented into linguistic units such as words, punctuation, numbers, alphanumeric, phrases, symbols, or other meaningful elements. Further, the pre-processing operation such as the stemming operation may be performed on the plurality of keywords. Stemming is a process of information retrieval to describe the process for reducing inflected words to root form of the word. For instance, the word 'marketing' contains the stem 'market', to which the derivational suffix -'ing' is attached to form a new stem 'marketing', to which the inflectional suffix -'ing' is attached. As a part of the pre-processing operation the event detection unit 208 performs POS tagging on the extracted plurality of keywords. POS tagging is also known as part-of-speech tagging or POST. POST is the process of marking up a keyword in a text (corpus) as corresponding to a particular part of speech, based on both its definition and context—that is relationship with adjacent and related words in a phrase, sentence, or paragraph. Furthermore, the pre-processing operation may include checking of the stop words, dirty words and other unwanted words, which are not related to an organization's products, services or brands and removing the identified stop words and dirty words.

In an embodiment, the processor 202 may extract the one or more first attributes of a profile associated with each of the plurality of customers. Further, the processor 202 may extract the one or more second attributes associated with the plurality of messages published by each of the plurality of customers. For example, the processor 202 may extract a profile id, a description of user, a registration date, a followers count, a followees count, and the like, as the one or more first attributes. In additional, the processor 202 may be configured to extract a number of hash-tags, a number of URL's in each message from the plurality of messages, a number of re-tweets, a number of mentions, HTTP links, trending topics, and duplicate tweets, as the one or more second attributes. Table 1, Table 2 and Table 3 shown below illustrate an example of the information (the one or more messages, the one or more first attributes, and the one or more second attributes) extracted by the processor 202.

The following table illustrates the information extracted pertaining to the plurality of messages.

TABLE 1

Information pertaining to the plurality of messages

| Message | Customer ID | Number of hash-tags | Number of URL's | Number of re-tweets |
|---|---|---|---|---|
| Message 1 | Customer 1 | 250 | 200 | 102 |
| Message 2 | Customer 2 | 20 | 15 | 0 |
| Message 3 | Customer 3 | 220 | 200 | 250 |
| Message 4 | Customer 4 | 100 | 50 | 45 |
| Message 5 | Customer 5 | 50 | 45 | 40 |
| Message 6 | Customer 6 | 200 | 102 | 250 |
| Message 7 | Customer 7 | 50 | 11 | 26 |

TABLE 1-continued

Information pertaining to the plurality of messages

| Message | Customer ID | Number of hash-tags | Number of URL's | Number of re-tweets |
|---|---|---|---|---|
| Message 8 | Customer 8 | 185 | 145 | 201 |
| Message 9 | Customer 9 | 180 | 150 | 200 |
| Message 10 | Customer 10 | 150 | 175 | 220 |

As shown in Table 1, the processor 202 extracts the information pertaining to the plurality of messages. The plurality of messages provides various customer related information, such as Customer ID, number of hash-tags, number of URL's, and number of re-tweets. For example, the processor 202 may extract the information pertaining to the Customer 1 from the Message 1. The information pertaining to the Customer 1 includes that Customer 1 has used 250 hash-tags in his/her posts, 200 URLs in the messages, and 100 re-tweets over Twitter. Similarly, Message 2 provides with the information pertaining to the Customer 2 where Customer 2 has used 20 hash-tags in his/her posts, 15 URLs in the messages, and 0 re-tweets over Twitter. In this manner, the processor 202 may extract the information related to the activity over social networking platforms of Customer 1 to Customer 10 from the Message 1 to Message 10.

The following table illustrates the information extracted pertaining to the plurality of keywords.

TABLE 2

Information pertaining to the plurality of keywords

| Message in which keyword is used | Keyword | First number of occurrences of keyword | Time Duration/Predefined time interval |
|---|---|---|---|
| Message 1, Message 3, Message 6 | Keyword 1 | 500 | Last 30 days |
| Message 2, Message 4 | Keyword 2 | 200 | Last 30 days |
| Message 3, Message 6, Message 8 | Keyword 3 | 450 | Last 30 days |
| Message 5, Message 4 | Keyword 4 | 150 | Last 30 days |
| Message 5, Message 7, Message 4 | Keyword 5 | 20 | Last 30 days |
| Message 6, Message 10, Message 8, Message 9 | Keyword 6 | 475 | Last 30 days |
| Message 2, Message 7, Message 4 | Keyword 7 | 256 | Last 30 days |
| Message 1, Message 10, Message 4 | Keyword 8 | 300 | Last 30 days |
| Message 1, Message 3, Message 6 | Keyword 9 | 325 | Last 30 days |
| Message 1, Message 3, Message 6, Message 8, Message 9 | Keyword 10 | 510 | Last 30 days |

Based on the information extracted in the plurality of messages as shown in Table 1, information pertaining to the plurality of keywords is extracted. The processor 202 may further extract the information pertaining to the plurality of keywords in the plurality of messages within the pre-defined time interval. For example, the processor 202 may extract and identify that the keyword 1 has occurred 500 times in the Message 1 to Message 10 over the last 30 days and further the keyword 2 occurred 200 times in the Message 1 to Message 10 in the same time duration. In this manner, the processor 202 extracts the information pertaining to the Keyword 1 to Keyword 10 from the Messages 1 to Messages 10.

The following table illustrates the information extracted pertaining to the plurality of customers that include the one or more first attributes and the one or more second attributes.

TABLE 3

Information pertaining to the plurality of customers

| | | First attributes | | | |
|---|---|---|---|---|---|
| Customer ID | Profile ID | Registration date | Followers count | Followees count | Daily message count |
| Customer 1 | John | 20 Dec. 2006 | 5014 | 400 | 90 |
| Customer 2 | Tom | 2 Dec. 2006 | 400 | 35 | 25 |
| Customer 3 | Andrew | 12 Jan. 2007 | 3560 | 300 | 70 |
| Customer 4 | Jack | 11 Jul. 2007 | 305 | 75 | 65 |
| Customer 5 | Tim | 31 Aug. 2007 | 248 | 50 | 20 |
| Customer 6 | Anu | 3 Nov. 2008 | 2450 | 200 | 50 |
| Customer 7 | Gary | 21 Dec. 2009 | 200 | 50 | 25 |
| Customer 8 | Barack | 2 Oct. 2010 | 1500 | 100 | 40 |
| Customer 9 | Jim | 14 Jun. 2014 | 1000 | 90 | 35 |
| Customer 10 | Hawk | 14 Jan. 2015 | 500 | 80 | 30 |

Based on the information extracted from the plurality of messages as shown in Table 1, information pertaining to the plurality of customers is extracted by the processor 202. The information pertaining to the plurality of customers are customer's profile ID, registration date, followers count, followees count, and daily message count. For example, customer 1's profile ID is John, registration date is Dec. 20, 2006, followers count is 5014, followees count is 400, and daily message count is 90. Similarly, Customer 2's profile ID is Tom, registration date is Dec. 2, 2006, followers count is 400, followees count is 35, and daily message count is 25. In this manner, the processor 202 may extract various information of Customer 1 to Customer 10 from the plurality of messages.

After extraction of the information as shown in Table 1, Table 2, and Table 3, the influencing customer detection unit 210 may be configured to determine the first score associated with the plurality of customers. The first score may be indicative of a measure of influence of each of the plurality of customers on other customers in the plurality of customers. In an embodiment, the first score is assigned based on the social influence via the "Klout Score", which is a numerical value between 1 and 100. The Klout score measures the size of a customer's social media network and correlates the content created by the customer to measure how other users interact with that content. For example, if a Customer 1 has a first score of 90, then the first score indicates that the measure of influence of Customer 1 on other customers in the plurality of customers is high. Similarly, if Customer 2, has a first score of 25, the first score indicates that the measure of influence of Customer 2 on other customers in the plurality of customers is low compared with Customer 1.

Further, the influencing customer detection unit 210 may be configured to determine the second score associated with the plurality of customers. The second score may be indicative of a degree of connectivity of each of the plurality of customers with the other customers in the plurality of customers and a measure of actions performed on each of the plurality of messages published by each of the plurality of customers. For example, Customer 1 may be connected with five other customers whereas the Customer 2 may be connected to only one other customer. Further, the messages published by customer 1 are shared 90 times over the network. In addition, the measure of actions performed on each of the plurality of messages published by the Customer 1 are high. For example, the number of re-tweets of the messages published by customer 1 is 102. Similarly, the measure of actions performed on each of the plurality of messages published by the Customer 2 is low. For example, the number of re-tweets of the messages published by Customer 2 is 0. Thus, in an embodiment, based on the degree of connectivity of each of the plurality of customers with the other customers in the plurality of customers and the measure of actions performed on each of the plurality of messages published by each of the plurality of customers, the influencing customer detection unit 210 may be configured to determine the second score within a range of 1-10. In an embodiment, 1 indicates a low degree of connectivity and a low number of measure of actions. Similarly, 10 indicates a high degree of connectivity and a high number of measure of actions.

TABLE 4

First score and second score of each of the plurality of customers

| Customer name | First score | Second Score |
|---|---|---|
| Customer 1 | 90 | 8 |
| Customer 2 | 25 | 3 |
| Customer 3 | 80 | 7.5 |
| Customer 4 | 40 | 4 |
| Customer 5 | 50 | 4.5 |
| Customer 6 | 75 | 7 |
| Customer 7 | 10 | 1 |
| Customer 8 | 65 | 6.5 |
| Customer 9 | 60 | 6 |
| Customer 10 | 55 | 5.5 |

After determining the first score and the second score as shown in Table 4, the influencing customer detection unit 210 may be configured to identify the set of influential customers from the plurality of customers based on the first score and the second score. The set of influential customers correspond to the customers who are active over the social networking platforms and are continuously mentioning about the products/services of the organization. In an embodiment, a predefined threshold associated with each of the first score and the second score may be utilized to extract the set of influential customers from the plurality of customers. For example, let us consider that the predefined threshold for the first score is 55 and the predefined threshold for the second score is 5.5. Accordingly, the influencing customer detection unit 210 may be configured to identify the set of influential customers from the plurality of customers. Following is an exemplary table to present the set of influential customers based on the first score and the second score. In an embodiment, both the first score and the second score are utilized to identify the set of influential customers from the plurality of customers.

TABLE 5

Set of influential customers

| Customer name | First score | Second Score |
|---|---|---|
| Customer 1 | 90 | 8 |
| Customer 3 | 80 | 7.5 |
| Customer 6 | 75 | 7 |
| Customer 8 | 65 | 6.5 |
| Customer 9 | 60 | 6 |
| Customer 10 | 55 | 5.5 |

After identifying the set of influential customers, the influencing customer detection unit 210 may be configured to assign the second rank to each customer from the set of influential customers based on the first score and the second score. In an embodiment, the second rank refers to a rank/number assigned to each customer from the set of influential customers based on the first score and the second score. In an embodiment, the second rank is indicative of the importance of the customer with respect to another customer. For example, if the second rank assigned to Customer 1 is one and the second rank assigned to Customer 3 is two, then it indicates that Customer 1 is more important than Customer 3. Following is an exemplary table to present the second rank to each customer from the set of influential customers based on the first score and the second score.

TABLE 5

Second rank of each customer from the set of influential customers

| Customer name | First score | Second Score | Second rank |
|---|---|---|---|
| Customer 1 | 90 | 8 | 1 |
| Customer 3 | 80 | 7.5 | 2 |
| Customer 6 | 75 | 7 | 3 |
| Customer 8 | 65 | 6.5 | 4 |
| Customer 9 | 60 | 6 | 5 |
| Customer 10 | 55 | 5.5 | 6 |

The influencing customer detection unit 210 may be configured to identify the one or more relevant influencing customers from the set of influential customers based on the second rank. In an embodiment, the one or more relevant influencing customers may correspond to top 'n' influencing customers. For example, if the user wants to know about top three influencing customers, then based on the second rank associated with each of the influencing customers, the influencing customer detection unit 210 may identify the top three influencing customers. For example, as shown in Table 5, six customers are present in the set of influential customers. Thus, based on the second rank, Customer 1, Customer 3, and Customer 6 may be identified as the top three influencing customers or the one or more relevant influencing customers.

After determining the one or more relevant influencing customers, the influencing keyword detection unit 212 may be configured to extract the set of influential keywords from the first set of messages (messages published by the set of influential customers). Further, the first number of occurrences of the plurality of keywords in the plurality of messages within the pre-defined time interval may be determined.

In an embodiment, the first set of messages may correspond to the messages published by the set of influential customers. For instance, as in the aforementioned table 5, Customer 1, Customer 3, Customer 6, Customer 8, Customer 9, and Customer 10 correspond to the set of influential customers. Hence, the messages published by these customers are the first set of messages. Thus, Message 1, Message 3, Message 6, Message 8, Message 9, and Message 10 correspond to the first set of messages.

The influencing keyword detection unit 212 may be configured to extract the set of influential keywords from the first set of messages based on the first number of occurrences of the plurality of keywords in the plurality of messages. The first set of messages may comprise Message 1, Message 3, Message 6, Message 8, Message 9, and Message 10. Table 6 shown below illustrates the set of influential keywords from the first set of messages and the corresponding first number of occurrences of the set of influential keywords.

TABLE 6

Set of influential keywords

| First set of messages in which the set of influential keywords is used | Set of influential keywords | First number of occurrences |
|---|---|---|
| Message 1, Message 3, Message 6 | Keyword 1 | 500 |
| Message 3, Message 6, Message 8 | Keyword 3 | 450 |
| Message 6, Message 10, Message 8, Message 9 | Keyword 6 | 475 |
| Message 1, Message 10 | Keyword 8 | 300 |
| Message 1, Message 3, Message 6 | Keyword 9 | 325 |
| Message 1, Message 3, Message 6, Message 8, Message 9 | Keyword 10 | 510 |

Further, after extraction of the set of influential keywords, the influencing keyword detection unit 212 may be configured to identify the one or more first common keywords. In an embodiment, the one or more first common keywords correspond to the keywords utilized by each customer from the set of influential customers. For example, the one or more common keywords may include the Keyword 1, Keyword 3, Keyword 6, Keyword 8, Keyword 9, and Keyword 10.

A person skilled in the art will understand that in an embodiment, the set of influential keywords may be same as the one or more first common keywords. However, the set of influential keywords may also include other keywords that may not necessarily be utilized by the set of influential customers. A person skilled in the art will understand that the examples described herein are for illustrative purposes and should not be construed to limit the scope of the disclosure.

After extracting the one or more first common keywords, the influencing keyword detection unit 212 may be configured to identify the one or more relevant influencing keywords from the one or more first common keywords based on the first number of occurrences of the keywords. In an embodiment, a pre-defined threshold associated with the first number of occurrences of the set of first common keywords may be utilized to identify the one or more relevant influencing keywords. For example, if the pre-defined threshold is 475. Thus, the one or more relevant influencing keywords may comprise Keyword 1, Keyword 6, and Keyword 10. In an embodiment, the one or more relevant influencing keywords may correspond to the top 'n' influencing keywords. For example, the top three influencing keywords are the Keyword 1, Keyword 6, and Keyword 10. Table 7 shown below illustrates the one or more relevant influencing keywords and the corresponding first number of occurrences.

TABLE 7

One or more relevant influential keywords

| First set of messages in which the one or more first common keyword is used | One or more relevant influential keywords | First number of occurrences |
|---|---|---|
| Message 1, Message 3, Message 6 | Keyword 1 | 500 |
| Message 6, Message 10, Message 8, Message 9 | Keyword 6 | 475 |
| Message 1, Message 3, Message 6, Message 8, Message 9 | Keyword 10 | 510 |

Based on the plurality of keywords and the information pertaining to the plurality of customers from the plurality of messages extracted by the processor 202, the spam customer detection unit 214 may be configured to identify the set of spam customers based on the one or more first attributes of profile associated with the plurality of customers, and the one or more second attributes associated with the plurality of messages published by each of the plurality of customers. In an embodiment, the one or more first attributes may comprise a profile id, a description of a user, a registration date, a followers count, and/or a followees count. Table 3 (as described earlier) and Table 8 shown below illustrate an example of the information pertaining to the first attributes and the second attributes.

As shown in Table 3, the spam customer detection unit 214 identifies the one or more first attributes of profile associated with the plurality of customers such as profile id, a description of a user, a registration date, a followers count, and/or a followees count. For example, first attributes of Customer 1 are shown as follows: profile id is John, description 1 is description of the Customer 1, the registration date is Dec. 20, 2006, followers count is 5014, and/or a followees count is 400. Similarly, the one or more first attributes of every customer may be identified through the spam customer detection unit 214. In an embodiment, the one or more second attributes (shown in Table 8) comprise a number of hash-tags, a number of URL's in each message from the plurality of messages, a number of re-tweets, a number of mentions, HTTP links, trending topics, and duplicate tweets. As shown in Table 8, the spam customer detection unit 214 identifies the one or more second attributes associated with the plurality of messages published by each of the plurality of customers. In an embodiment, the one or more second attributes may comprise a number of hash-tags, a number of URL's in each message from the plurality of messages, a number of re-tweets, a number of mentions, HTTP links, trending topics, and duplicate tweets. For example, the one or more second attributes pertaining to the customer 1 are 250 hash-tags, 200 URLs in each message from the plurality of messages, 102 re-tweets, 400 mentions, 90 HTTP links, Trend 1 is trending topic, and 85 duplicate tweets. Similarly, the spam customer detection unit 214 identifies the one or more second attributes for Customer 2 to Customer 10.

TABLE 8

Information pertaining to one or more second attributes associated with the plurality of messages published by each of the plurality of customers

| | Second Attributes | | | | | | |
|---|---|---|---|---|---|---|---|
| Customer ID | Number of hash-tags | Number of URL's | Number of re-tweets | Number of mentions | HTTP links | Trending topics | Duplicate tweets |
| Customer 1 | 250 | 200 | 102 | 400 | 90 | Trend 1 | 85 |
| Customer 2 | 20 | 15 | 0 | 35 | 25 | Trend 2 | 25 |
| Customer 3 | 220 | 200 | 250 | 300 | 70 | Trend 3 | 32 |
| Customer 4 | 100 | 50 | 45 | 75 | 65 | Trend 4 | 40 |
| Customer 5 | 50 | 45 | 40 | 50 | 20 | Trend 5 | 36 |
| Customer 6 | 200 | 102 | 250 | 200 | 50 | Trend 6 | 25 |
| Customer 7 | 50 | 11 | 26 | 50 | 25 | Trend 7 | 15 |
| Customer 8 | 185 | 145 | 201 | 100 | 40 | Trend 8 | 45 |
| Customer 9 | 180 | 150 | 200 | 90 | 35 | Trend 9 | 25 |
| Customer 10 | 150 | 175 | 220 | 80 | 30 | Trend 10 | 36 |

Based on the one or more first attributes and the one or more second attributes, the spam customer detection unit 214 may be configured to identify the set of spam customers. For example, Customer 4 has 40 duplicate tweets. In addition, the number of followers of customer 4 are 305, the number of followees are 75 and the daily message count is 65. Thus, based on this the spam customer detection unit 214 may identify Customer 4 as a spam customer. Accordingly, the Customer 2, Customer 5, and Customer 7 may also be identified as the spam customers. Thus, the set of spam customers may comprise Customer 2, Customer 4, Customer 5, and Customer 7.

The spam customer detection unit 214 may be configured to assign the first rank to each customer from the set of spam customers based on the one or more first attributes and the one or more second attributes. For example, the spam customer detection unit 214 may identify the set of spam customers based on at least the number of duplicate tweets published by the customers, followers count, followees count, and daily message count. In an embodiment, the first rank refers to a rank/number assigned to each customer in the set of spam customers based on the one or more first attributes and the one or more second attributes. In an embodiment, the first rank is indicative of the importance of the spam customer with respect to another spam customer. For example, if the first rank assigned to spam Customer 2 is one and the first rank assigned to spam Customer 4 is two, then it indicates that spam Customer 2 is more important than spam Customer 4. Table 9 shown below illustrates an example of the first rank assigned to each of the customers from the set of spam customers.

TABLE 9

First rank assigned to each customer from the set of spam customers

| Customer name | First Rank |
| --- | --- |
| Customer 2 | 1 |
| Customer 4 | 2 |
| Customer 5 | 3 |
| Customer 7 | 4 |

The spam customer detection unit 214 may be configured to identify the one or more relevant spam customers from the set of spam customers based on the first rank. In an embodiment, the one or more relevant spam customers may correspond to top 'n' spam customers. For example, if the user wants to know about the top two spam customers, then based on the first rank associated with each of the spam customers, the spam customer detection unit 214 may identify the top two spam customers. For example, as shown in Table 9, four customers are present in the set of spam customers. Thus, based on the first rank, Customer 2, and Customer 4 may be identified as the top two spam customers or the one or more relevant spam customers.

After determining the one or more relevant spam customers, the spam keyword detection unit 216 may be configured to extract the set of spam keywords from the second set of messages based on the first number of occurrences of the plurality of keywords in the plurality of messages within the pre-defined time interval. In an embodiment, the second set of messages correspond to messages from the plurality of messages published by the set of spam customers within the pre-defined time interval. Thus, the second set of messages may comprise Message 2, Message 4, Message 5, and Message 7. For example, the set of spam keywords may comprise Keyword 2, Keyword 4, Keyword 5, and Keyword 7. Table 10 shown below illustrates the set of spam keywords from the second set of messages and the corresponding first number of occurrences of the set of spam keywords.

TABLE 10

Set of spam keywords

| Second set of messages in which the set of spam keywords is used | Set of spam keywords | First number of occurrences |
| --- | --- | --- |
| Message 2, Message 4 | Keyword 2 | 200 |
| Message 5, Message 4 | Keyword 4 | 150 |
| Message 5, Message 7, Message 4 | Keyword 5 | 20 |
| Message 2, Message 7, Message 4 | Keyword 7 | 256 |

Further, the spam keyword detection unit 216 may be configured to extract the one or more second common keywords from the second set of messages. In an embodiment, the one or more second common keywords correspond to keywords utilized by the set of spam customers. For example, the one or more second common keywords may comprise the Keyword 2, Keyword 4, Keyword 5, and Keyword 7.

A person skilled in the art will understand that in an embodiment, the set of spam keywords may be same as the one or more second common keywords. However, the set of spam keywords may also include other keywords that may not necessarily be utilized by the set of spam customers. A person skilled in the art will understand that the examples described herein are for illustrative purposes and should not be construed to limit the scope of the disclosure.

The spam keyword detection unit 216 may be configured to identify the one or more relevant spam keywords from the one or more second common keywords. In an embodiment, a pre-defined threshold associated with the first number of occurrences may be utilized to identify one or more relevant spam keywords. For example, if the pre-defined threshold is 200, then the one or more relevant spam keywords may comprise Keyword 2, and Keyword 7. In an embodiment, the one or more relevant spam keywords may correspond to the top 'n' spam keywords. For example, the top 2 spam keywords comprise the Keyword 2, and Keyword 7. Table 11 shown below illustrates the one or more relevant spam keywords and the corresponding first number of occurrences.

TABLE 11

One or more relevant spam keywords

| Second set of messages in which the one or more relevant spam keywords is used | One or more relevant spam keywords | First number of occurrences |
| --- | --- | --- |
| Message 2, Message 4 | Keyword 2 | 200 |
| Message 2, Message 7, Message 4 | Keyword 7 | 256 |

After completing the pre-processing operations, the event detection unit 208 may be configured to extract the one or more nouns (one or more events) from the plurality of keywords. In an embodiment, the one or more nouns may correspond to the one or more events. In an embodiment, the one or more nouns relate to the events of service/product associated with the organization. As shown in following table, one or more nouns are Aquos, Replacement, HTC EVO, Chicago, GooglePlay Tapscreen, BootForce, etc. Further, the count and daily average count of the nouns are also shown in the Table 12. Count is the total number of occurrence of the noun in the plurality of keywords. However, daily average count corresponds to the total number of occurrence of the nouns in the plurality of keywords per day.

TABLE 12

One or more nouns (one or more events) extracted from plurality of keywords

| Event Name | Count | Daily Average Count |
| --- | --- | --- |
| Aquos | 136 | 103 |
| Replacement | 113 | 85 |
| HTC EVO | 85 | 58 |

TABLE 12-continued

One or more nouns (one or more events) extracted
from plurality of keywords

| Event Name | Count | Daily Average Count |
|---|---|---|
| Chicago | 80 | 32 |
| GooglePlay Tapscreen | 72 | 62 |
| BootForce | 60 | 54 |

The event detection unit 208 may be configured to categorize each of the one or more events into the first event category or the second event category. In an embodiment, the first event category corresponds to the category where a first event occurred within the pre-defined time interval. As shown in the Table 13, the first events are aquos, replacement and HTC EVO that have occurred within the pre-defined time interval.

TABLE 13

First event category

| \Event Name | Count | Daily Average Count |
|---|---|---|
| Aquos | 136 | 103 |
| Replacement | 113 | 85 |
| HTC EVO | 85 | 58 |

In an embodiment, the second event category corresponds to the category where a second event occurred before the pre-defined time interval and has occurred within the pre-defined time interval. As shown in the Table 14, the second events are Chicago, GooglePlay Tapscreen and BootForce, which have occurred before the pre-defined time interval and have occurred within the pre-defined time interval. For example, the second events Chicago, GooglePlay Tapscreen and BootForce had occurred before the pre-defined time interval and have occurred within the pre-defined time interval. Thus, such second events correspond to anomaly events.

TABLE 14

Second event category

| Event Name | Count | Daily Average Count |
|---|---|---|
| Chicago | 80 | 32 |
| Google Play Tapscreen | 72 | 62 |
| BootForce | 60 | 54 |

The event detection unit 208 may be configured to assign the third rank to each event from the one or more events. The third rank refers to a rank/number assigned to each event from the one or more events based on the first number of occurrences of the plurality of keywords in the plurality of messages. In an embodiment, the third rank is indicative of the importance of the event with respect to the other events. For example, if the event Aquos occurs the maximum number of times in the plurality of messages, the event Aquos may be assigned the highest rank. Accordingly, based on the number of occurrences of the plurality of keywords (events) in the plurality of messages, the third rank may be assigned to the remaining events. Table 15 shown below illustrates the third rank assigned to each of the one or more events.

TABLE 15

Third rank of each of the one or more events

| Event Name | Third Rank |
|---|---|
| Aquos | 1 |
| Replacement | 2 |
| HTC EVO | 3 |
| Chicago | 4 |
| GooglePlay Tapscreen | 5 |
| BootForce | 6 |

The event detection unit 208 may be configured to determine set of relevant first events and set of relevant second events from the categorized one or more events based on the third rank. In an embodiment, the set of relevant first events may correspond to top new events that have occurred within the pre-defined time interval. For instance, the events Aquos, Replacement, and HTC EVO are top new events that have occurred within the pre-defined time interval. In an embodiment, the set of relevant second events may correspond to 'anomalous' events which may have occurred before the pre-defied time interval but experience a sudden increase in the plurality of messages shared over the social networking platforms within the pre-defined time interval. For instance, the events Chicago, GooglePlay Tapscreen, and BootForce are top anomalous events that have occurred before the pre-defined time interval and have occurred within the pre-defined time interval.

Further the query creation unit 218 may create the query that may include a combination of the one or more relevant influencing customers, one or more keywords/terms and multiple Boolean operators like ANY, AND, OR, NEAR, NOT and the like. Example of the query related to the at least one or more relevant influencing customers and the one or more relevant influencing keywords: ((Customer 1 or Customer 3 or Customer 6 or Customer 9 or Customer 8 or Customer 10) AND (Keyword 1 or Keyword 3 or Keyword 6 or Keyword 8 or Keyword 9 or Keyword 10)). Example of the query related to inclusion of events in the first event category and/or exclude events in second event category: ((Aquos or Replacement or HTC EVO) NOT (Chicago or GooglePlay Tapscreen or BootForce)). Example of the query related to exclusion of at least set of spam customers from the set of influential customers: NOT ((Customer 2 or Customer 4 or Customer 5 or Customer 7)). Example of the query related to exclusion of the set of spam keywords from the set of relevant keywords: NOT ((Keyword 2 or Keyword 4 or Keyword 5 or Keyword 7)).

The transceiver may transmit the generated query to the user-computing device 108. The user-computing device 108 may display the generated query to the user of the user-computing device 108. In an alternate embodiment, the application server 104 may transmit information pertaining to the set of influential customers, the one or more relevant influencing customers, the one or more relevant influencing keywords, the set of spam customers, the one or more relevant spam customers, the set of spam keywords, the one or more relevant spam keywords, events in the first event category, and events in the second event category to the user-computing device 108. The user-computing device 108 may display the information on the display screen of the user-computing device 108. Further, an input may be received from the user to include/exclude the information based on which the query may be generated.

In an embodiment, the generated search query may be displayed in the Curated Stream Definition Language (CSDL) format. CSDL is specific to a particular social-networking data provider. The search terms or keywords created by the organizations are simple form of keywords to be converted into the form of stream definition that is specific to a particular social networking data provider. The data providers may get stream definition from the user and return matching plurality of messages.

A person skilled in the art will understand that the scope of the disclosure should not be limited to generating the search query based on the aforementioned factors and using the aforementioned techniques. Further, the examples provided in supra are for illustrative purposes and should not be construed to limit the scope of the disclosure.

Figure 3:
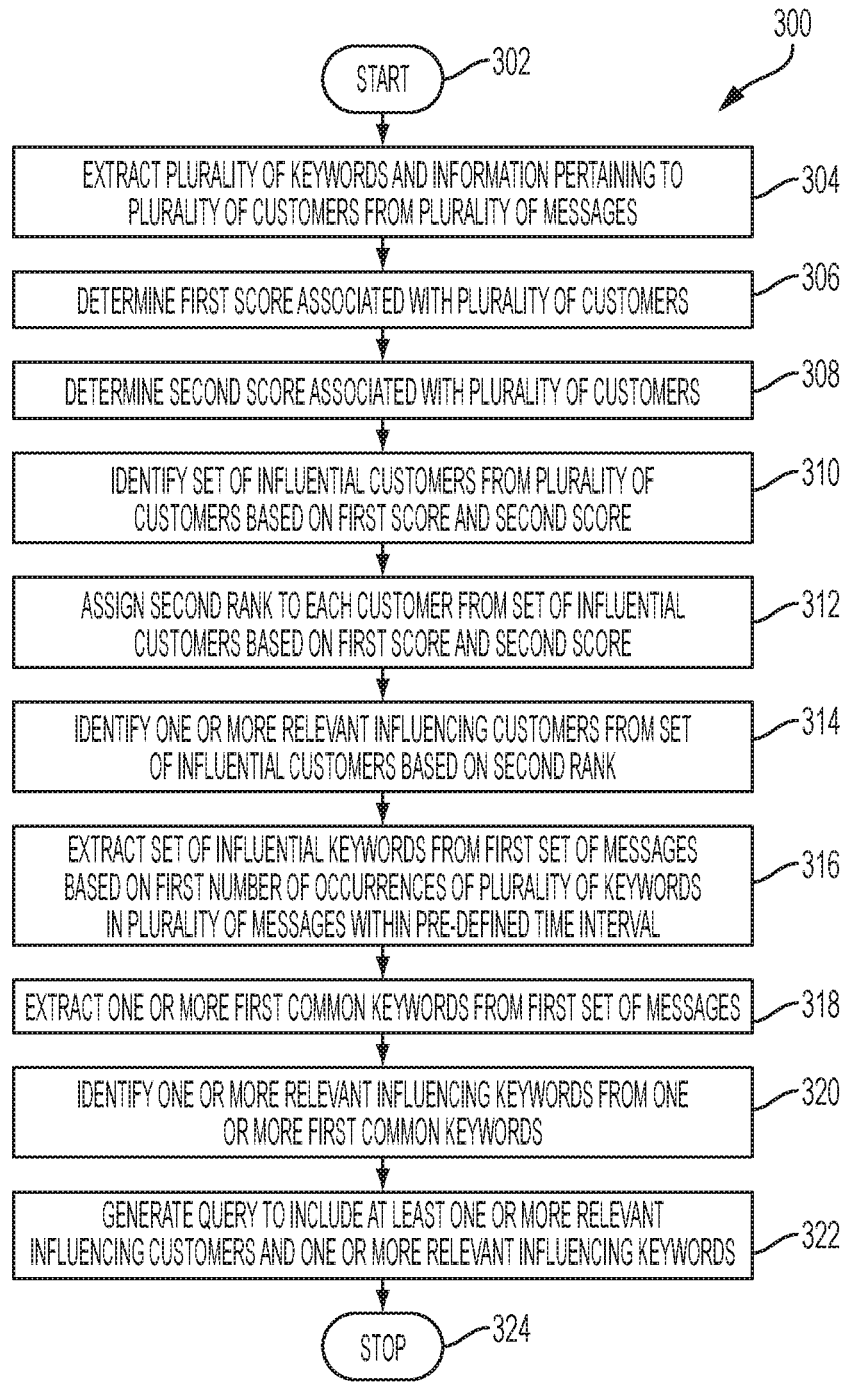
FIG. 3 illustrates a flowchart of a method to generate a query that includes one or more relevant influencing customers and one or more relevant influencing keywords, in accordance with at least one embodiment.

FIG. 3 is a flowchart 300 that illustrates a method to generate a search query to extract one or more relevant messages from a plurality of messages, in accordance with at least one embodiment. The flowchart 300 is described in conjunction with FIG. 1 and FIG. 2.

The method starts at step 302. At step 304, the application server 104 may extract the plurality of keywords and information pertaining to the plurality of customers from the plurality of messages. At step 306, the application server 104 may determine the first score associated with the plurality of customers. At step 308, the application server 104 may determine the second score associated with the plurality of customers. At step 310, the application server 104 may identify the set of influential customers from the plurality of customers based on the first score and the second score. In an embodiment, the first score may be indicative of the measure of influence of each of the plurality of customers on other customers in the plurality of customers. In an embodiment, the second score may be indicative of a degree of connectivity of each of the plurality of customers with the other customers in the plurality of customers and the measure of actions performed on each of the plurality of messages published by each of the plurality of customers. At step 312, the application server 104 may assign the second rank to each customer from the set of influential customers based on the first score and the second score. At step 314, the application server 104 may identify the one or more relevant influencing customers from the set of influential customers based on the second rank. At step 316, the application server 104 may extract the set of influential keywords from the first set of messages based on the first number of occurrences of the plurality of keywords in the plurality of messages within the pre-defined time interval. At step 318, the application server 104 may extract the one or more first common keywords from the first set of messages. At step 320, the application server 104 may identify the one or more relevant influencing keywords from the one or more first common keywords. At step 322, the application server 104 may generate the query to include at least the one or more relevant influencing customers and the one or more relevant influencing keywords. Control passes to end step 324.

Figure 4:
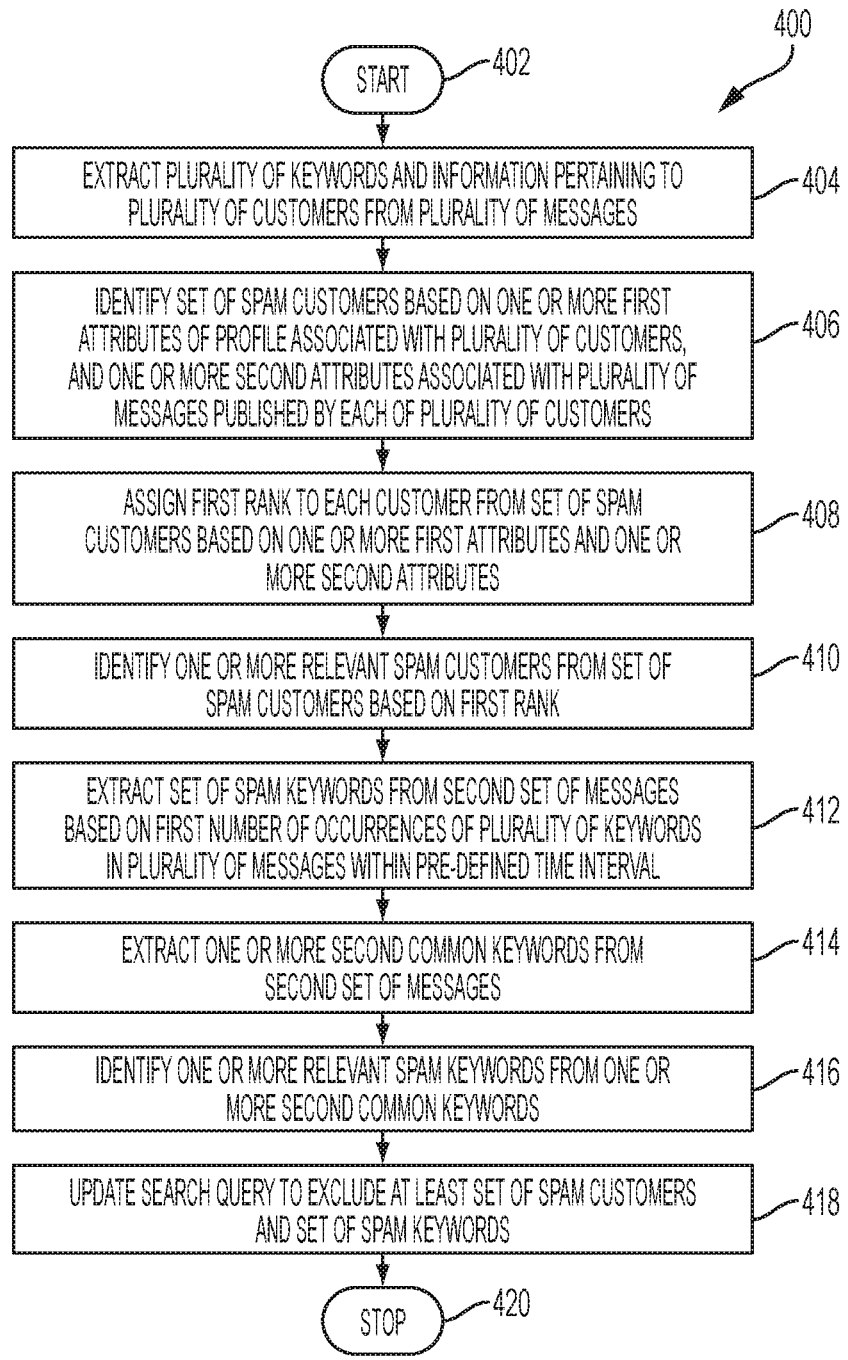
FIG. 4 illustrates a flowchart of a method to update a query that excludes a set of spam customers and a set of spam keywords, in accordance with at least one embodiment.

FIG. 4 is a flowchart 400 that illustrates a method to update the query that excludes the set of spam customers and the set of spam keywords, in accordance with at least one embodiment. The flowchart 400 is described in conjunction with FIG. 1 and FIG. 2.

The method starts at step 402. At step 404, the application server 104 may extract the plurality of keywords and information pertaining to the plurality of customers from the plurality of messages. At step 406, the application server 104 may identify the set of spam customers based on the one or more first attributes of the profile associated with each of the plurality of customers, and the one or more second attributes associated with the plurality of messages published by each of the plurality of customers. At step 408, the application server 104 may assign the first rank to each customer from the set of spam customers based on the one or more first attributes and the one or more second attributes. At step 410, the application server 104 may identify the one or more relevant spam customers from the set of spam customers based on the first rank. At step 412, the application server 104 may extract the set of spam keywords from the second set of messages based on the first number of occurrences of the plurality of keywords in the plurality of messages within the pre-defined time interval. At step 414, the application server 104 may extract the one or more second common keywords from the second set of messages. At step 416, the application server 104 in conjunction with the processor 202 may identify the one or more relevant spam keywords from the one or more second common keywords. At step 418, the application server 104 may update the search query to exclude at least the set of spam customers and the set of spam keywords. Control passes to end step 420.

Figure 5:
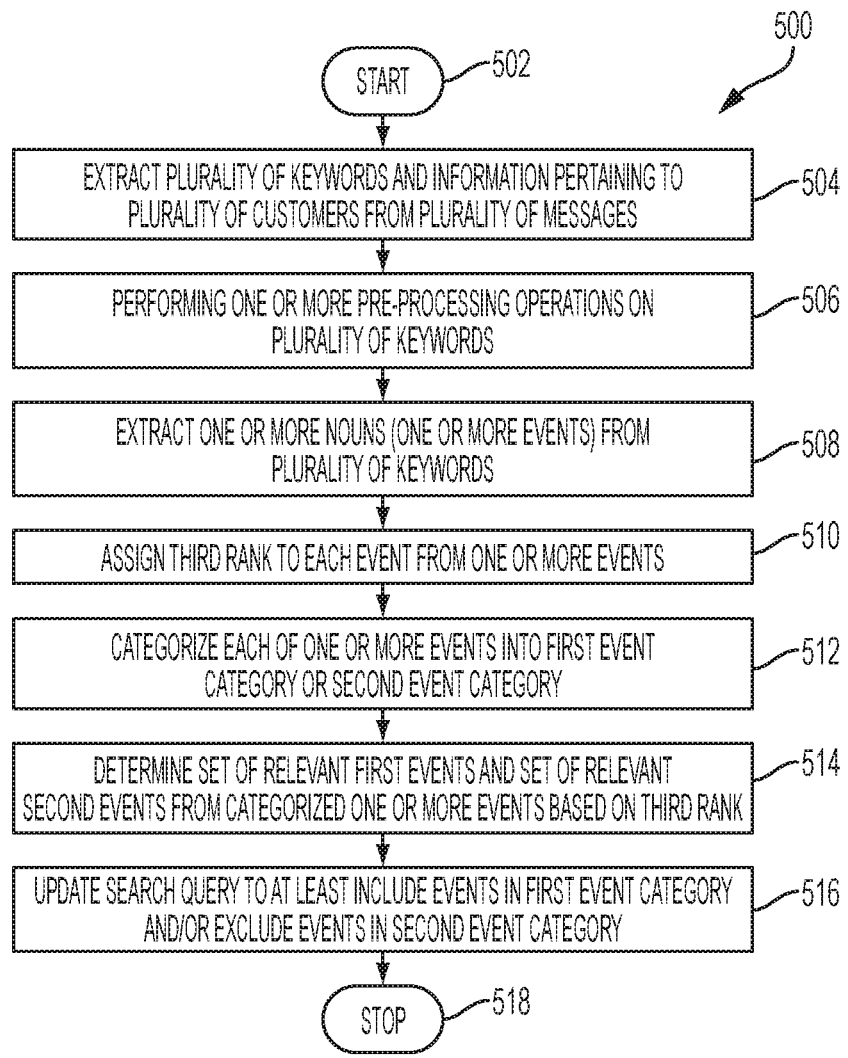
FIG. 5 illustrates a flowchart of a method to update a query that includes one or more events of a first event category and/or excludes the one or more events of a second event category, in accordance with at least one embodiment.

FIG. 5 is a flowchart 500 that illustrates a method to update the query that includes events of the first event category and/or excludes the events of the second event category, in accordance with at least one embodiment. The flowchart 500 is described in conjunction with FIG. 1 and FIG. 2.

The method starts at step 502. At step 504, the application server 104 may extract the plurality of keywords, and information pertaining to the plurality of customers from the plurality of messages. At step 506, the application server 104 may perform the one or more pre-processing operations on the plurality of keywords. At step 508, the application server 104 may extract the one or more nouns (one or more events) from the plurality of keywords. At step 510, the application server 104 may assign the third rank to each event from the one or more events. At step 512, the application server 104 may categorize each of the one or more events into the first event category or the second event category. At step 514, the application server 104 may determine the set of relevant first events and the set of relevant second events from the categorized one or more events based on the third rank. At step 516, the application server 104 may update the search query to at least include events in the first event category and/or exclude events in the second event category. Control passes to end step 518.

Figure 6:
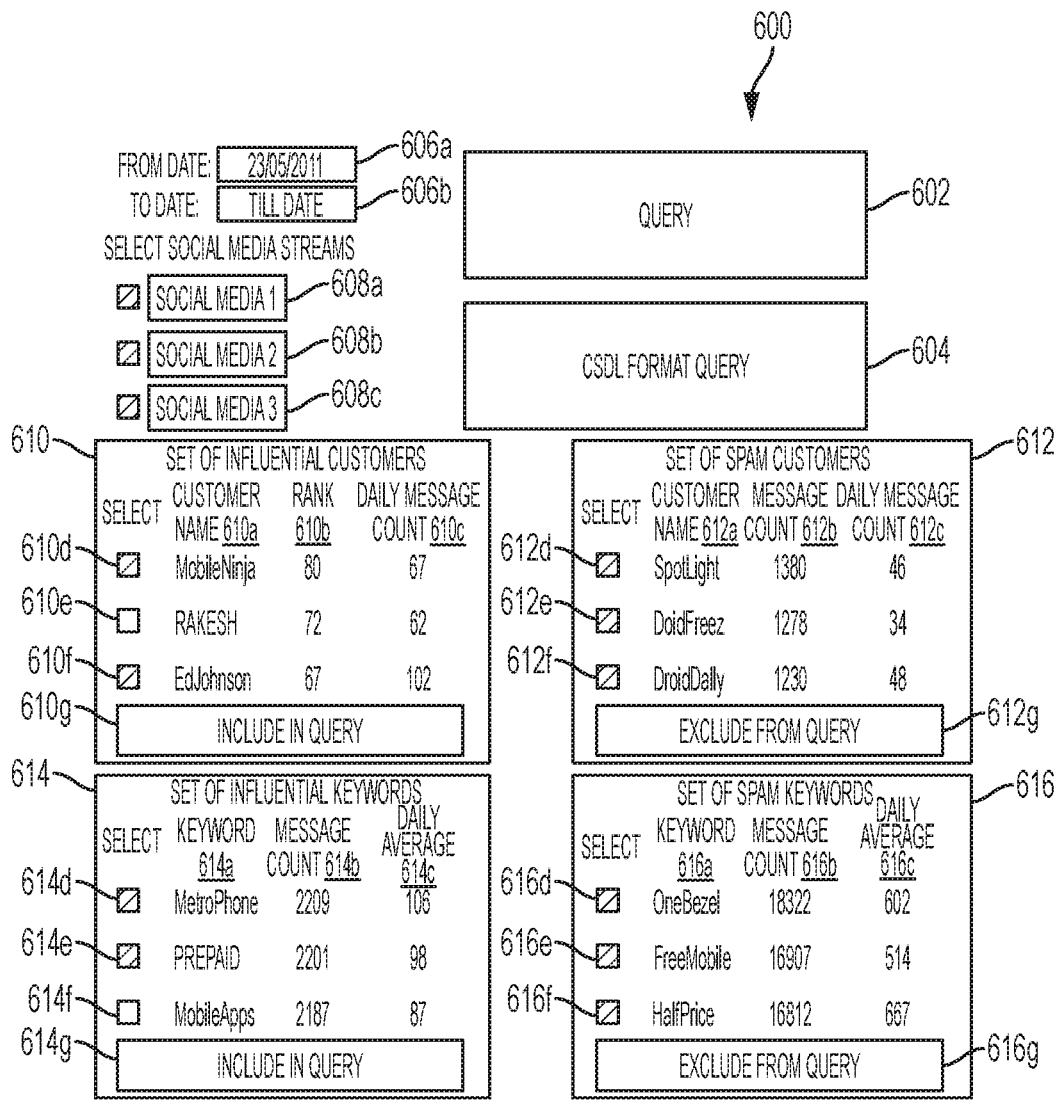
FIG. 6 illustrates a user interface to generate a search query to extract one or more relevant messages from a plurality of messages shared over a computer network, in accordance with at least one embodiment.

FIG. 6 illustrates an exemplary user-interface 600 presented on the user-computing device to display the generated query in accordance with at least one embodiment. The user interface 600 is described in conjunction with FIG. 1 and FIG. 2.

In an embodiment, the user interface 600 includes a first input text box 602 where the generated query may be displayed. Further, a second input text box 604 may be utilized to display the generated query in the CSDL format. 606a and 606b correspond to input boxes that may be utilized by the user to provide a date range (pre-defined time interval) for which the query should be generated. Further, 608a, 608b, and 608c correspond to the various social media data sources that may be utilized by the application server 104 to extract the one or more relevant messages based on the generated query.

Further, the user interface 600 comprises a first display area 610, a second display area 612, a third display area 614, and a fourth display area 616. In an embodiment, the first display area 610 displays the set of influential customers. The first display area 610 may display the information associated with the set of influential customers in a tabular format. For example, the first column 610a may correspond to the customer name, the second column 610b may correspond to the rank of the customer, and the third column 610c may display the daily message count of the customer. Further, one or more selection boxes 610d, 610e, and 610f associated with each row in the table may be provided to the user. In an embodiment, the user may select the customers using an input operation. Further, the first display area 610 includes a first control button 610g that may be utilized by the user to include the selected set of influential customers in the query.

The second display area 612 displays the set of spam customers. The second display area 612 may display the information associated with the set of influential customers in a tabular format. For example, the first column 612a may correspond to the customer name, the second column 612b may correspond to the message count, and the third column 612c may display the daily message count of the customer. Further, the one or more selection boxes 612d, 612e, and 612f associated with each row in the table may be provided to the user. In an embodiment, the user may select the customers using an input operation. Further, the second display area 612 includes a second control button 612g that may be utilized by the user to exclude the selected set of spam customers from the query.

The third display area 614 displays the set of influential keywords. The third display area 614 may display the information associated with the set of influential keywords in a tabular format. For example, the first column 614a may correspond to the keyword, the second column 614b may correspond to the message count, and the third column 614c may display the daily average count of the keyword. Further, the one or more selection boxes 614d, 614e, and 614f associated with each row in the table may be provided to the user. In an embodiment, the user may select the keywords using an input operation. Further, the third display area 614 includes a third control button 614g that may be utilized by the user to include the selected set of influential keywords in the query.

The fourth display area 616 displays the set of spam keywords. The fourth display area 616 may display the information associated with the set of spam keywords in a tabular format. For example, the first column 616a may correspond to the keyword, the second column 616b may correspond to the message count, and the third column 616c may display the daily average count of the keyword. Further, the one or more selection boxes 616d, 616e, and 616f associated with each row in the table may be provided to the user. In an embodiment, the user may select the keywords using an input operation. Further, the fourth display area 616 includes a fourth control button 616g that may be utilized by the user to exclude the selected set of spam keywords from the query.

A person skilled in the art will understand that the user-interface 600 is described herein for illustrative purposes and should not be construed to limit the scope of the disclosure.

Various embodiments of the disclosure provide a non-transitory computer readable medium and/or storage medium, and/or a non-transitory machine readable medium and/or storage medium having stored thereon, a machine code and/or a computer program having at least one code section executable by a machine and/or a computer to generate a search query to extract one or more relevant messages. The at least one code section in an application server 104 causes the machine and/or computer to perform the steps, which comprise extracting a plurality of keywords and information pertaining to a plurality of customers from a plurality of messages. The computer may further identify a set of influential customers from the plurality of customers based on a first score and a second score, wherein the first score is indicative of a measure of influence of each of the plurality of customers on other customers in the plurality of customers and, wherein the second score is indicative of a degree of connectivity of each of the plurality of customers with the other customers in the plurality of customers and a measure of actions performed on each of a plurality of messages published by each of the plurality of customers. The computer may further extract a set of influential keywords from a first set of messages based on a first number of occurrences of the plurality of keywords in the plurality of messages within a pre-defined time interval, wherein the first set of messages corresponds to messages published by the set of influential customers. The compute may further generate a search query that includes at least the set of influential customers, and the set of influential keywords.

Various embodiments of the disclosure encompass numerous advantages including methods and systems for generating the search query. In an embodiment, the method and system may be utilized to generate the search query. The generated search query enables the user to identify changing behavior of customer preferences, occurring events, and trending topics over a pre-defined time interval. Further, the method and system disclosed herein update the query automatically to include the set of influential customers, and the set of influential keywords, thereby improving the efficiency of the system to generate the search query. In addition, to retrieve one or more relevant messages, the method and system disclosed herein exclude the set of spam customers and the set of spam keywords. Thus, the redundant and noisy messages are discarded and the extracted one or more relevant messages may be used by the organization to learn what the customers are discussing about the services and products, associated with the organization, over the social networking platforms.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for generating a search query to extract one or more relevant messages from a plurality of messages shared over a computer network, the method comprising:

extracting from a database server, by one or more processors of an application server, a plurality of keywords and information pertaining to a plurality of customers, from the plurality of messages shared over the computer network;

identifying, from the plurality of keywords and information pertaining to the plurality of customers by an influencing customer detection unit of the application server, a set of influential customers from the plurality of customers based on a first score and a second score, wherein the first score is determined for each customer, by the influencing customer detection unit, based on a size of a customer's social media network and how other customers interact with content created by the customer, wherein the second score is determined for each customer, by the influencing customer detection unit, based on a degree of connectivity of the customer with the other customers of the plurality of customers, and a measure of actions performed on each message of the plurality of messages published by the customer;

extracting from the plurality of keywords and information pertaining to a plurality of customers, by an influencing keyword detection unit of the application server, a set of influential keywords published by the identified set of influential customers based on a first number of occurrences of the plurality of keywords in the plurality of messages within a pre-defined time interval;

extracting, by an event detection unit of the application server, one or more nouns from the set of influential keywords, wherein each of the one or more nouns corresponds to one or more events, services, or products;

assigning, by the event detection unit, a first rank to each event, service, or product from the one or more events, services, or products based on the first number of occurrences of each influential keyword of the set of influential keywords;

categorizing, by the event detection unit, each of the one or more events, services, or products into a first event category or a second event category, wherein events, services, or products categorized in the first event category have occurred within the pre-defined time interval, and wherein events, services, or products categorized in the second event category have occurred before the pre-defined time interval and have occurred within the pre-defined time interval, wherein a second number of occurrences associated with the events, services, or products in the second event category is greater than a pre-defined threshold within the pre-defined time interval;

generating, by a query creation unit of the application server, the search query comprising the set of influential customers, the set of influential keywords, and a Boolean operator;

transmitting, by a transceiver of the application server, the generated search query for display on a user interface of a user-computing device; and extracting from the database server, by the one or more processors of the application server, one or more relevant messages using the generated search query.

2. The method of claim 1, further comprising identifying, by the one or more processors, a set of spam customers based on one or more first attributes of a profile associated with the plurality of customers, and one or more second attributes associated with the plurality of messages published by each of the plurality of customers.

3. The method of claim 2, wherein the one or more first attributes comprise a profile id, a description of a user, a registration date, a followers count, and/or a followees count.

4. The method of claim 2, wherein the one or more second attributes comprise a number of hash-tags, a number of URL's in each message from the plurality of messages, a number of re-tweets, a number of mentions, HTTP links, trending topics, and duplicate tweets.

5. The method of claim 2, further comprising assigning, by the one or more processors, a second rank to each customer in the set of spam customers based on the one or more first attributes and the one or more second attributes, wherein one or more relevant spam customers are identified from the set of spam customers based on the second rank.

6. The method of claim 2, further comprising extracting, by the one or more processors, a set of spam keywords from a second set of messages based on the first number of occurrences of the plurality of keywords in the plurality of messages within a pre-defined time interval, wherein the second set of messages corresponds to messages published by the set of spam customers.

7. The method of claim 6, further comprising updating, by the one or more processors, the search query to exclude at least the set of spam customers, and the set of spam keywords.

8. The method of claim 6, further comprising extracting, by the one or more processors, one or more second common keywords from the second set of messages, wherein the one or more second common keywords corresponds to keywords utilized by each customer from the set of spam customers.

9. The method of claim 8, further comprising identifying, by the one or more processors, one or more relevant spam keywords from the one or more second common keywords based on the first number of occurrences of the plurality of keywords in the plurality of messages.

10. The method of claim 1, further comprising assigning, by the one or more processors, a third rank to each customer from the set of influential customers based on the first score and the second score, wherein one or more relevant influential customers are identified from the set of influential customers based on the third rank.

11. The method of claim 1, further comprising determining, by the one or more processors, a set of relevant first events and a set of relevant second events from the categorized one or more events based on the rank assigned to each event from the one or more events.

12. The method of claim 1, further comprising updating, by the one or more processors, the search query to include the events in the first event category and/or exclude the events in the second event category.

13. An application server to generate a search query to extract one or more relevant messages from a plurality of messages shared over a computer network, the application server comprising:
- one or more processors of an application server configured to:
  - extract from a database server a plurality of keywords and information pertaining to a plurality of customers from the plurality of messages shared over the computer network;
  - an influencing customer detection unit of the application server configured to:
    - identify from the plurality of keywords and information pertaining to the plurality of customers a set of influential customers from the plurality of customers based on a first score and a second score, wherein the first score is determined for each customer, by the influencing customer detection unit, based on a size of a customer's social media network and how other customers interact with content created by the customer, wherein the second score is determined for each customer based on of a degree of connectivity of the customer with the other customers of the plurality of customers, and a measure of actions performed on each message of the plurality of messages published by the customer;
  - an influencing keyword detection unit of the application server configured to:
    - extract from the plurality of keywords and information pertaining to a plurality of customers a set of influential keywords published by the identified set of influential customers based on a first number of occurrences of the plurality of keywords in the plurality of messages within a pre-defined time interval; and
  - an event detection unit of the application server configured to:
    - extract one or more nouns from the set of influential keywords, wherein each of the one or more nouns corresponds to one or more events, services, or products;
    - assign a rank to each event, service, or product from the one or more events, services, or products based on the first number of occurrences of each influential keyword of the set of influential keywords;
    - categorize each of the one or more events, services, or products into a first event category or a second event category, wherein events categorized in the first event category have occurred within the pre-defined time interval, and wherein events, services, or products categorized in the second event category have occurred before the pre-defined time interval and have occurred within the pre-defined time interval, wherein a second number of occurrences associated with the events, services, or products in the second event category is greater than a pre-defined threshold within the pre-defined time interval;
  - a query creation unit of the application server configured to:
    - generate the search query comprising the set of influential customers, the set of influential keywords, and a Boolean operator; and
  - a transceiver of the application server configured to transmit the generated search query for display on a user interface of a user-computing device,
  - wherein the one or more processors of an application server is further configured to extract from the database server one or more relevant messages using the generated search query.

14. A non-transitory computer-readable storage medium having stored thereon, a set of computer-executable instructions for causing a computer comprising one or more processors to perform steps comprising:
- extracting from a database server, by one or more processors of an application server, a plurality of keywords and information pertaining to a plurality of customers, from a plurality of messages shared over a computer network;
- identifying, from the plurality of keywords and information pertaining to the plurality of customers by an influencing customer detection unit of the application server, a set of influential customers from the plurality of customers based on a first score and a second score, wherein the first score is determined for each customer, by the influencing customer detection unit, based on a size of a customer's social media network and how other customers interact with content created by the customer, wherein the second score is determined for each customer, by the influencing customer detection unit, based on a degree of connectivity of the customer with the other customers of the plurality of customers, and a measure of actions performed on each message of the plurality of messages published by the customer;
- extracting from the plurality of keywords and information pertaining to a plurality of customers, by an influencing keyword detection unit of the application server, a set of influential keywords published by the identified set of influential customers based on a first number of occurrences of the plurality of keywords in the plurality of messages within a pre-defined time interval;
- extracting, by an event detection unit of the application server, one or more nouns from the set of influential keywords, wherein each of the one or more nouns corresponds to one or more events, services, or products;
- assigning, by the event detection unit, a first rank to each event, service, or product from the one or more events, services, or products based on the first number of occurrences of each influential keyword of the set of influential keywords;
- categorizing, by the one or more processors the event detection unit, each of the one or more events, services, or products into a first event category or a second event category, wherein events, services, or products categorized in the first event category have occurred within the pre-defined time interval, and wherein events, services, or products categorized in the second event category have occurred before the pre-defined time interval and have occurred within the pre-defined time interval, wherein a second number of occurrences associated with the events, services, or products in the second event category is greater than a pre-defined threshold within the pre-defined time interval;
- generating, by a query creation unit of the application server, a search query comprising the set of influential customers, the set of influential keywords, and a Boolean operator;

transmitting, by a transceiver of the application server, the generated search query for display on a user interface of a user-computing device, and extracting from the database server, by the one or more processors of the application server, one or more relevant messages using the generated search query.

* * * * *